United States Patent [19]

Abe

[11] Patent Number: 4,989,574
[45] Date of Patent: Feb. 5, 1991

[54] ELECTROMAGNETIC PICKUP

[75] Inventor: Kunihiro Abe, Higashimurayama, Japan

[73] Assignee: Fuji Jukogyo Kabushiki Kaisha, Tokyo, Japan

[21] Appl. No.: 411,321

[22] Filed: Sep. 22, 1989

[30] Foreign Application Priority Data

Sep. 27, 1988 [JP] Japan .................. 63-241871
Jan. 11, 1989 [JP] Japan ..................... 1-4358

[51] Int. Cl.⁵ .................. F02P 7/06; H01F 15/04
[52] U.S. Cl. ..................... 123/617; 123/476;
324/207.25; 310/155; 336/84 M; 336/90; 336/110
[58] Field of Search .......... 310/155; 324/67, 173, 324/174, 208, 242, 243, 234, 207.25; 336/84 M, 84 R, 83, 110, 90, 96; 123/414, 617, 476

[56] References Cited

U.S. PATENT DOCUMENTS

| 2,933,677 | 4/1960 | Lieber | 336/84 M |
| 3,252,024 | 5/1966 | Loudon | 310/155 |
| 4,256,986 | 3/1981 | Anderson | 310/155 |
| 4,268,771 | 5/1981 | Lace | 310/155 X |
| 4,276,489 | 6/1981 | Dron et al. | 310/155 |
| 4,596,973 | 6/1986 | Form et al. | 336/110 X |
| 4,647,892 | 3/1987 | Hewitt | 336/110 X |
| 4,721,864 | 1/1988 | Goossens | 310/155 X |

FOREIGN PATENT DOCUMENTS 57-186102 11/1982 Japan .

Primary Examiner—Thomas J. Kozma
Attorney, Agent, or Firm—Martin A. Faber

[57] ABSTRACT

An electromagnetic pickup has a coil and a core. A noise shielding cylindrical member of magnetic material is provided around the coil to form an open magnetic circuit between the noise shielding member and the core.

11 Claims, 11 Drawing Sheets

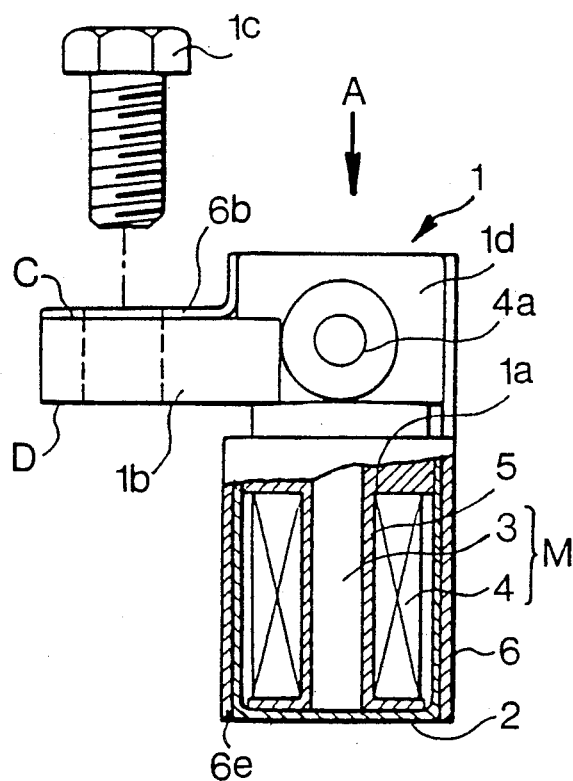
FIG. 1a
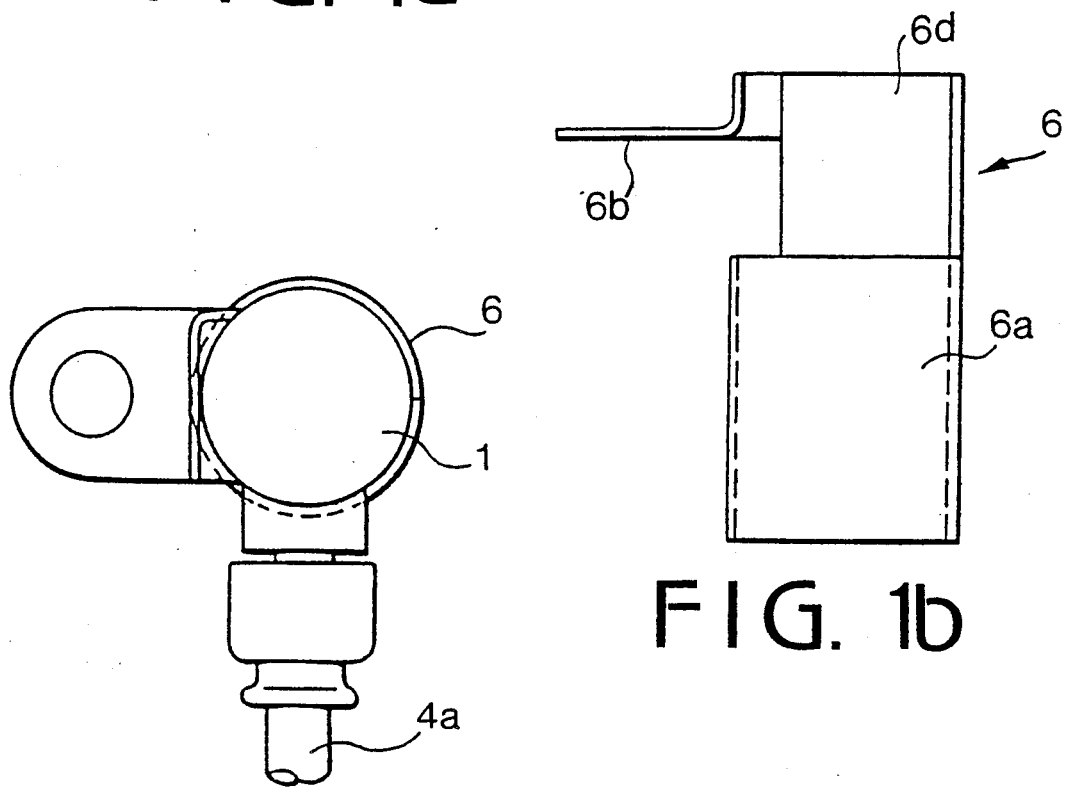
FIG. 1b
FIG. 2

4,989,574

ELECTROMAGNETIC PICKUP

BACKGROUND OF THE INVENTION

The present invention relates to an electromagnetic pickup and more particularly to a pickup employed in a crank angle detecting system of an engine for a motor vehicle.

The crank angle detecting system is provided for detecting the crank angle dependent on the angular position of a crankshaft of the engine. A disk having a plurality of projections on the periphery thereof is secured to the crankshaft, and an electromagnetic pickup is provided for sensing the position of the projections. The detected crank angle is used for controlling ignition timing and fuel injection timing of the engine.

FIG. 19a shows an electromagnetic pickup employed in a system for ignition timing control. When a pulse generator disk 101 rotates, an electromagnetic pickup 102 detects the angular position of projections on the disk 101 and produces a signal which is applied to a control circuit 103. In the control circuit 103, an output signal of the electromagnetic pickup 102 is converted into a pulse signal by a waveform shaping circuit. The control circuit 103 calculates ignition timing and engine speed based on the crank signal in accordance with an input signal from a load sensor 104 such as an intake passage pressure sensor and produces a timing signal which is applied to an ignition device 105.

When the pulse generator disk 101 rotates, the projection passes the electromagnetic pickup 102 with a predetermined clearance L so that the magnetic flux between the disk 101 and the electromagnetic pickup 102 varies. Thus, the electromagnetic pickup 102 generates electromotive force having a voltage e in proportion to the variation of magnetic flux $d\phi/dt$. The output voltage e is compared with a reference voltage R in the waveform shaping circuit as shown in FIG. 19b and a crank signal P in the form of a pulse is produced as shown in FIG. 19c.

Since the disk 101 and the electromagnetic pickup 102 are provided in the engine, induced voltage in accordance with the variation of an external magnetic field caused by a current for a starter and a charging current from an alternator enters the output of the electromagnetic pickup 102 as noise. Accordingly, a pulse signal due to the noise is produced as shown in FIG. 19c.

Japanese Patent Application Laid-Open 57-186102 discloses a magnetic pickup which operates to eliminate noises, thereby producing only the necessary output signal.

However, the pickup eliminates the only noise which has a lower voltage than the output voltage of the magnetic pickup. Accordingly, if the external magnetic field is largely changed near the magnetic pickup, a noise having a large peak value enters the output of the magnetic pickup, which cannot be eliminated from the output. Consequently, proper ignition timing or correct engine speed is not calculated, which causes malfunction of the engine, and hence reduction of engine power and increase of fuel consumption.

SUMMARY OF THE INVENTION

The object of the present invention is to provide an electromagnetic pickup which reliably detects the position of a crankshaft by preventing noise from entering the output of the pickup.

Other objects and features of this invention will become understood from the following description with reference to the accompanying drawings.

BRIEF DESCRIPTION OF DRAWINGS

FIG. 1a is a front view, partly shown in section, showing an electromagnetic pickup having a noise shielding member according to the present invention;

FIG. 1b is a front view of the noise shielding member;

FIG. 2 is a plan view of the electromagnetic pickup of FIG. 1a as viewed in the direction of an arrow A;

FIG. 8b shows a noise waveform of the electromagnetic pickup having the noise shielding member of FIG. 8a;

FIG. 7 is a front sectional view of a fifth embodiment;

DETAILED DESCRIPTION OF THE PREFERRED EMBODIMENTS

Figure 3:
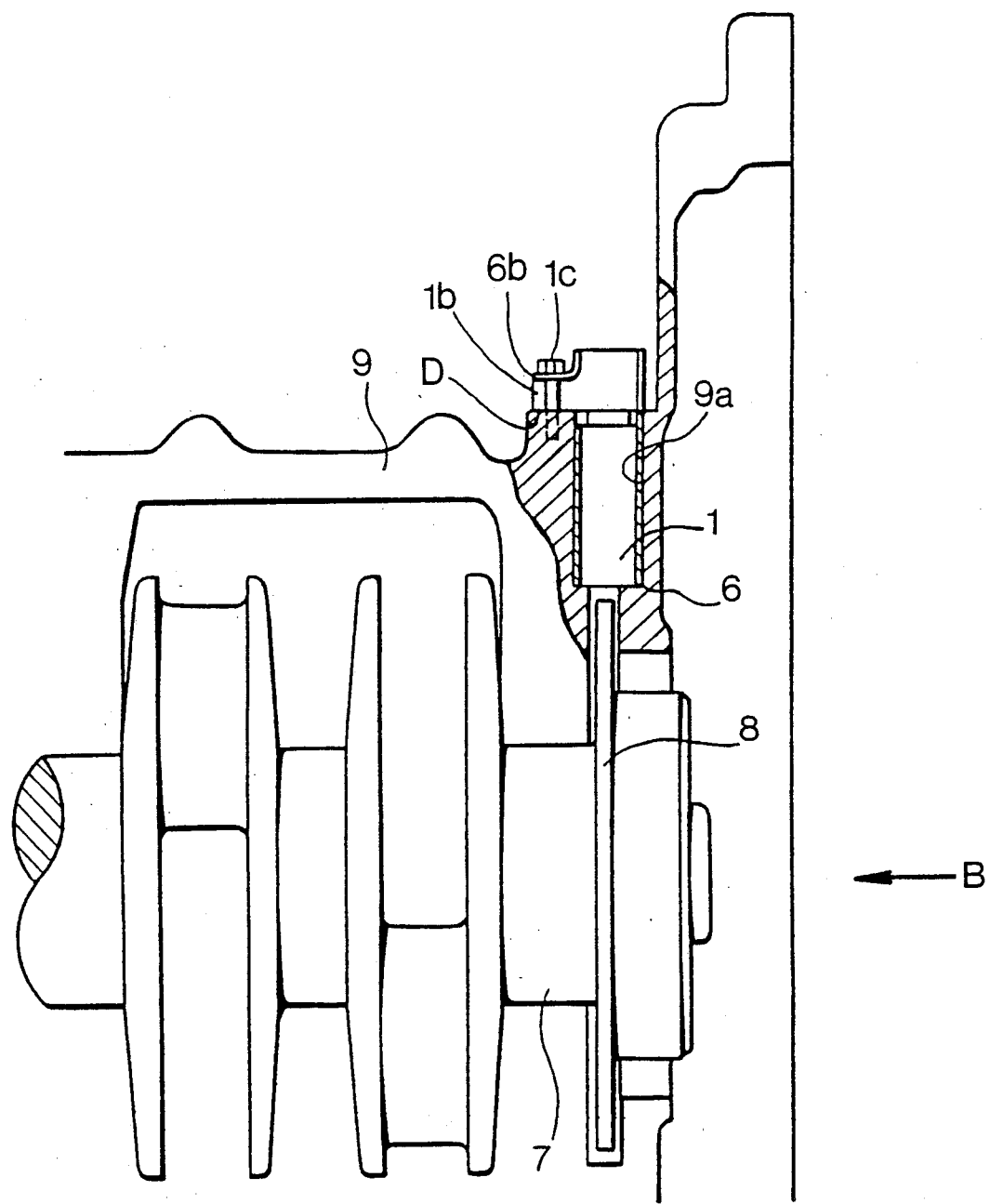
FIG. 3 is a side view showing a part of a crankshaft of an automotive engine.

Referring to FIGS. 1 and 2, an electromagnetic pickup 1 according to the present invention has a cylindrical main body 1a made of plastic. The main body 1a has an upper body 1d integral with the main body 1a, and a flange 1b. An electromagnet M is secured to the main body 1a. The electromagnet comprises an electromagnetic coil 4 around a bobbin 5 and a core 3 of ferromagnetic material, such as a permanent magnet provided in the bobbin 5. The electromagnet is housed in a casing 2 made of non-magnetic material having a cylindrical body and a bottom plate. A noise shielding member 6 is securely mounted on the electromagnetic pickup 1. The noise shielding member 6 is made of magnetic material such as iron, iron alloy or nickel for shielding the electromagnetic pickup 1 from noise. The noise shielding member 6 has a cylindrical body 6a having an opening 6e and mounted on the casing 2 of the main body 1a to form an open magnetic circuit between the noise shielding member and the core 3. The shielding member 6 has further a half-round cover 6d mounted on the upper body 1d and a flange 6b extending from the half-round cover 6d and mounted on an upper surface C of the flange 1b. The coil 4 is connected to a conductor 4a which is exposed from the upper body 1d and connected to an external circuit (not shown). The conductor 4a is shielded to prevent noise from entering.

The electromagnetic pickup 1 having the noise shielding member 6 is provided adjacent a crankshaft 7 of an engine as shown in FIG. 3. The crankshaft 7 rotatably mounted in a crankcase 9 has a pulse generator disk 8 made of magnetic material secured to a rear end thereof. The electromagnetic pickup 1 is mounted in a hole 9a formed in the crankcase 9 corresponding to the pulse generator disk 8 with a predetermined clearance. The flange 1b is secured by a screw 1c to the crankcase 9 at an attaching surface D opposite to the surface C covered by the flange 6b.

In the embodiment of the present invention, the engine is made of nonferrous metal such as aluminum alloy.

Since flange 1b is directly engaged with the crankcase 9 without interposing the flange 6b of the noise shielding member 6, the thickness of the flange 6b does not affect the dimension of the clearance between the pickup and the pulse generator disk 8.

Figure 4:
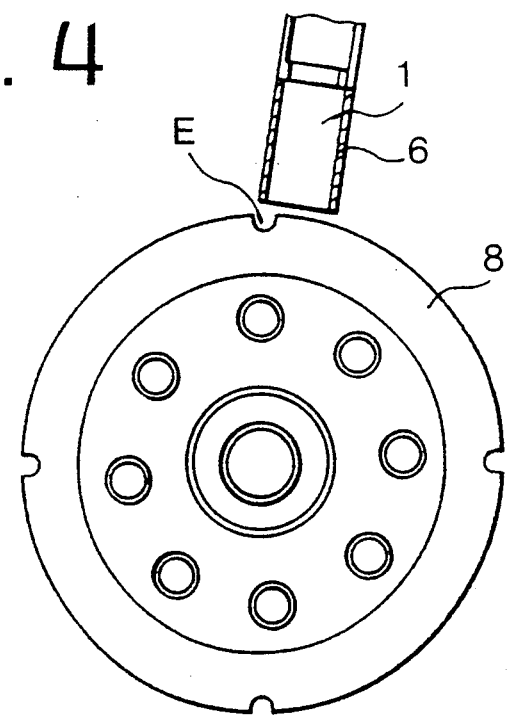
FIG. 4 is a front view of the crankshaft as viewed in the direction of an arrow B of FIG. 3.

Referring to FIG. 4, the pulse generator disk 8 has a plurality of notches E formed on an outer periphery thereof at predetermined regular angular intervals. For example, each notch E represents the angular position of the top dead center of a corresponding cylinder of the engine. The electromagnetic pickup 1 is disposed to detect the notch E.

Figure 5:
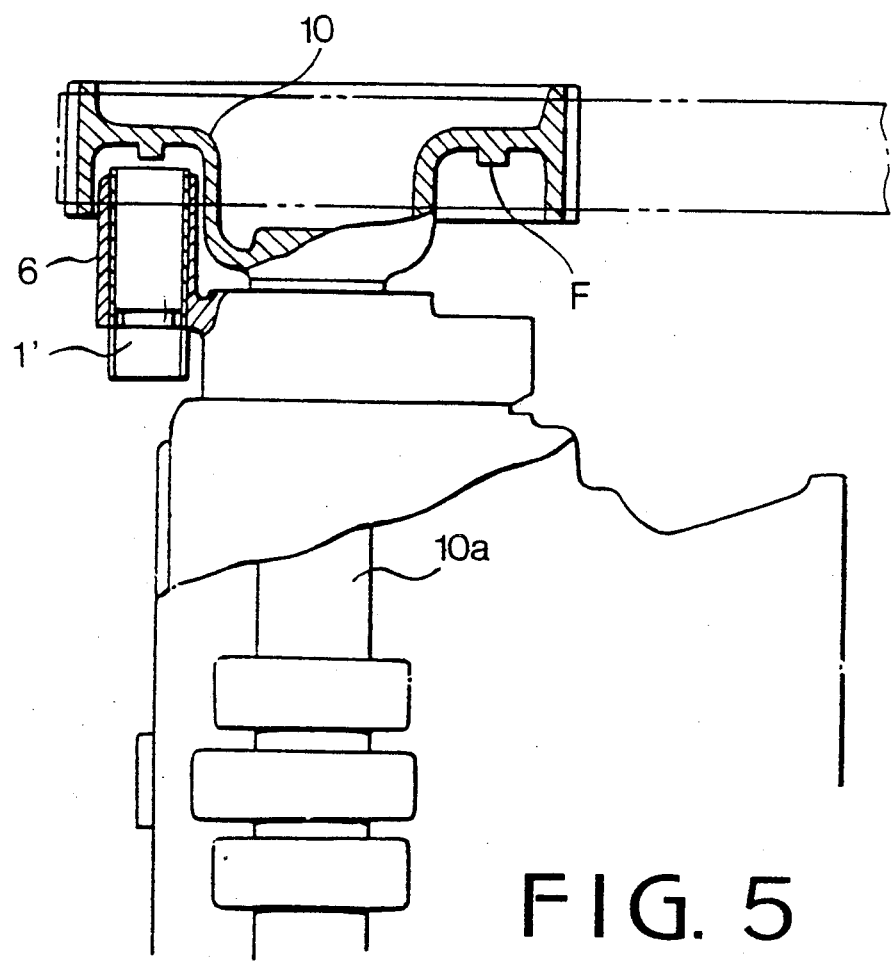
FIG. 5 is a sectional side view showing a part of a camshaft.

Referring to FIG. 5, another electromagnetic pickup 1' having the same structure as the electromagnetic pickup 1 is provided adjacent a camshaft 10a. A camshaft pulley 10 secured to the camshaft 10a is connected to a crankshaft pulley (not shown) on the crankshaft 7 through a timing belt. The camshaft pulley 10 is provided with projections F formed on a side thereof at regular angular intervals. Each projection F identifies a corresponding cylinder. The electromagnetic pickup 1' is disposed for detecting the projection F and producing a signal.

Describing the operation of the electromagnetic pickup 1, when the engine starts and the pulse generator disk 8 rotates, the notch E of the disk 8 intermitingly enters the magnetic field generating from the core 3 of the electromagnetic pickup 1. Namely, when the notch E closes the electromagnetic pickup 1, the magnetic flux between the core 3 and the disk 8 reduces. When the notch E passes the electromagnetic pickup 1, the magnetic flux increases.

In accordance with the electromagnetic induction by the variation $d\phi/dt$ of the magnetic flux $\phi$, an alternating current is induced in the electromagnetic coil 4 having a voltage e in proportion to the variation of the magnetic flux $d\phi/dt$. Since the voltage e is produced in a direction opposing the changing of the magnetic flux $\phi$, alternating voltage is produced as a signal. The signal is converted into a pulse signal N by a waveform shaping circuit (not shown).

Simultaneously, the electromagnetic pickup 1' detects the projection F on the cam pulley 10 to produce a signal which is converted into a pulse signal G by the waveform shaping circuit for discriminating the cylinder. Thus, ignition timing and fuel injection timing are controlled based on the signals N and G in a well-known manner per se.

There are provided many electric components in the engine which produce noise, for example, switching noise caused by switching of switches or power transistors, spark noise by the ignition system, noise produced by a brush of a motor, and noise caused by electromagnetic induction of an external magnetic field produced by a current of a starter or a charging current from an alternator. If voltage is produced in the electromagnetic coil 4 in accordance with the variation of the external magnetic field caused by noise, erroneous pulse signals are produced, which disturb the control of the ignition timing and fuel injection timing.

Figure 6:
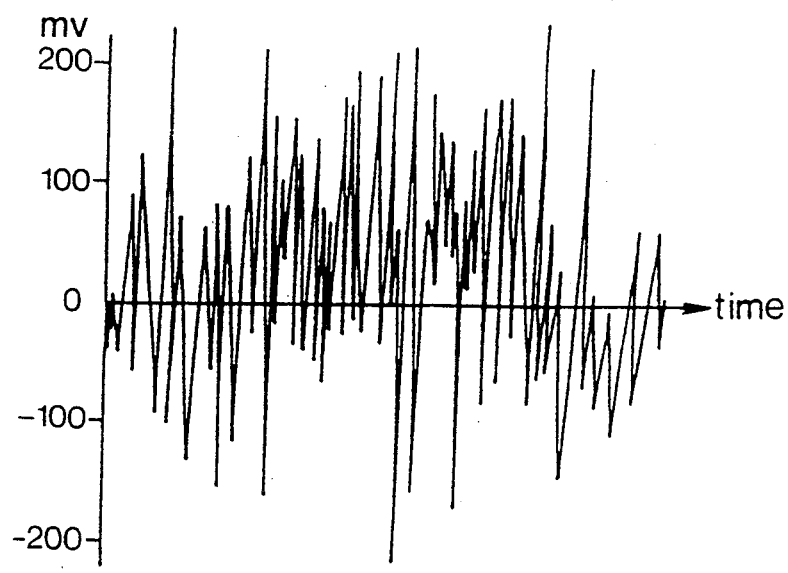
FIG. 6 shows a waveform of noises in the output of the electromagnetic pickup without the noise shielding member.

FIG. 6 shows a waveform of an output of the electromagnetic pickup 1 without the noise shielding member 6. A peak-to-peak value of an erroneous voltage induced by noise becomes about 450 mV which is close to a voltage of a normal output signal.

Figure 7A:
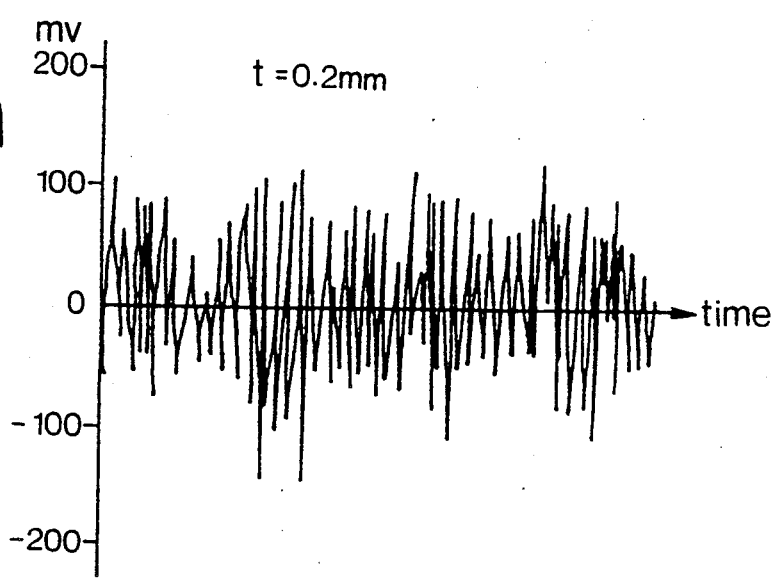
FIGS. 7a and 7b are waveforms of noise in the output of the electromagnetic pickup having the noise shielding member.
Figure 7B:
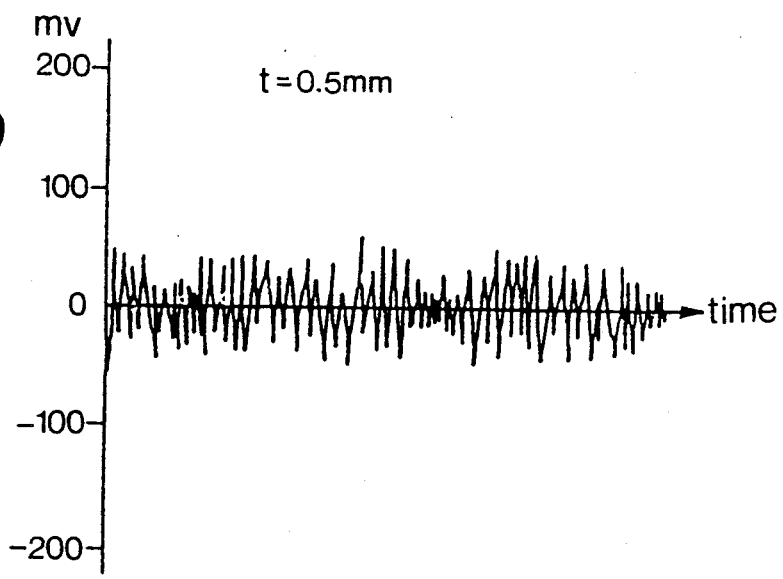

However, under such conditions, if the noise shielding member 6 is attached to the electromagnetic pickup 1, noise is effectively attenuated as shown in FIGS. 7a and 7b. Furthermore, it will be understood that the magnitude of the noise attenuation changes with the thickness of the cylindrical body 6a of the noise shielding member 6.

FIG. 7a shows a waveform of noise produced by the electromagnetic pickup 1 employed with the noise shielding member 6 having a thickness t of 0.2 mm at the cylindrical body 6a. The noise is attenuated −6 dB. The effect on the attenuation of noise is rather insufficient.

FIG. 7b shows a noise level when the noise shielding member 6 is 0.5 mm in thickness. The noise is remarkably attenuated −14 dB.

Further, effects on the attenuation of noise is changed by changing the shape of the noise shielding member 6 or changing the position of the noise shielding member 6 with respect to the pickup 1.

Figure 8A:
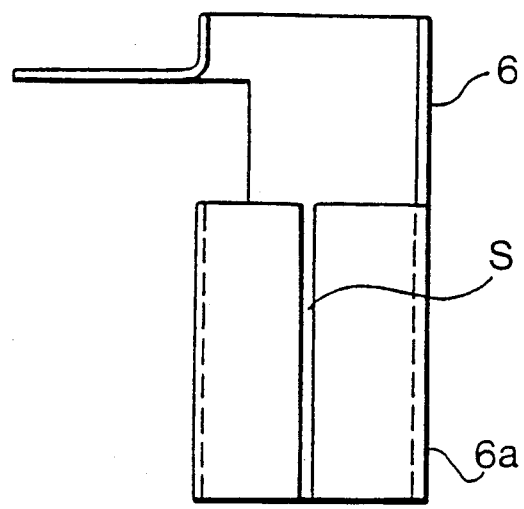
FIG. 8a is a front view showing a modification of the noise shielding member.
Figure 8B:
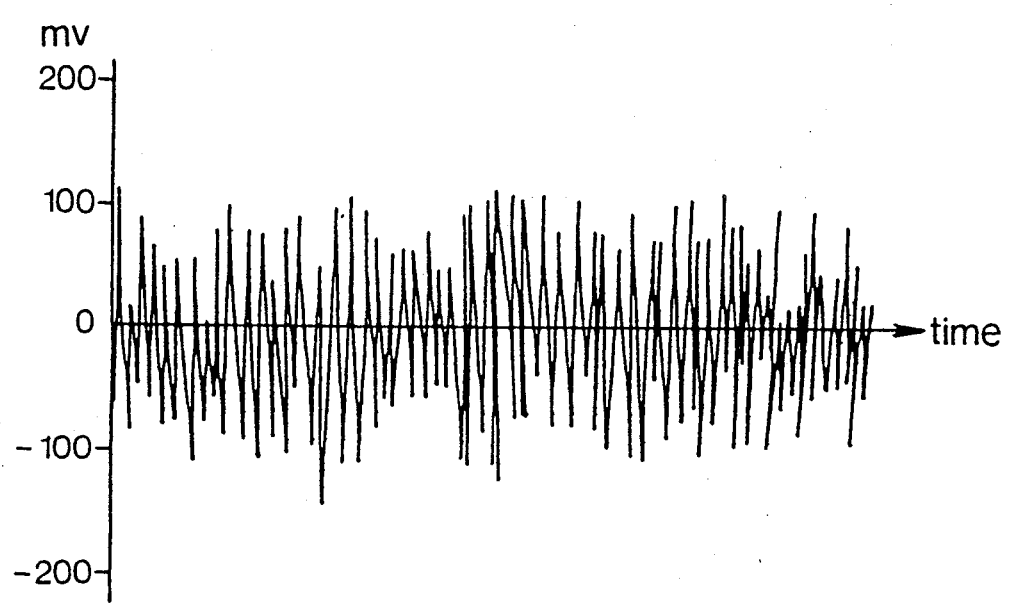

FIG. 8a shows the noise shielding member 6 formed with lengthwise slit S formed on a cylindrical body 6a. The thickness of the cylindrical body 6a is 0.5 mm. Since the direction of the external magnetic field is not specified, the external magnetic field induces a current in the electromagnetic coil 4 of the electromagnetic pickup 1 through the slit S. As shown in FIG. 8b, the noise level thereof becomes the same as the noise level due to the noise shielding member 6 having the thickness of 0.2 mm.

Figure 9A:
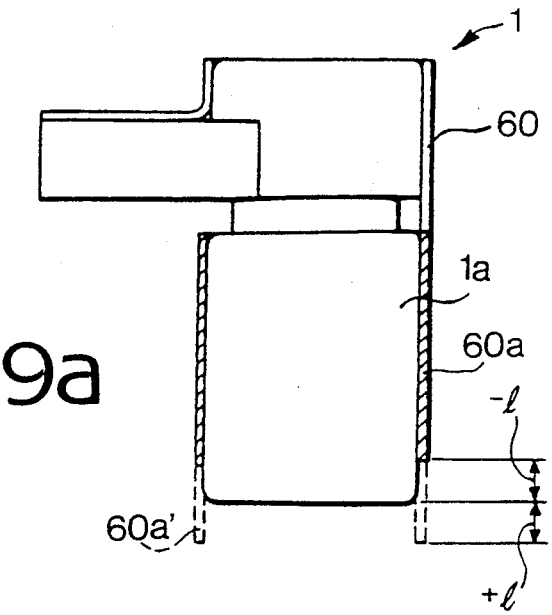
FIG. 9a shows an explanatory illustration showing another modification of the noise shielding member.
Figure 9B:
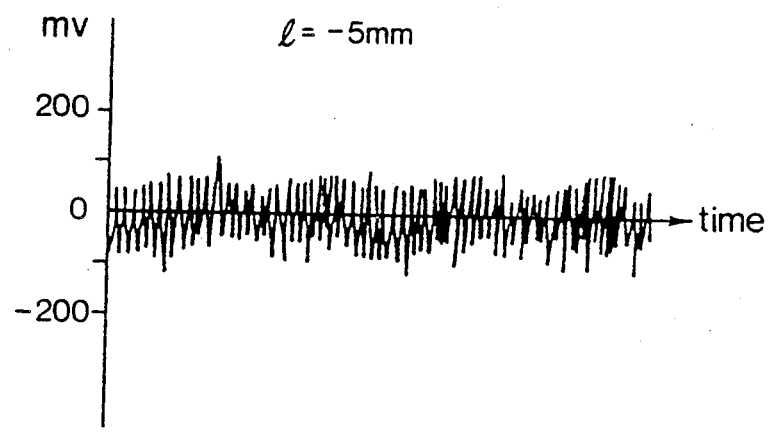
FIGS. 9b and 9c show noise waveforms when the noise shielding member of FIG. 9a is used for the electromagnetic pickup.
Figure 9C:
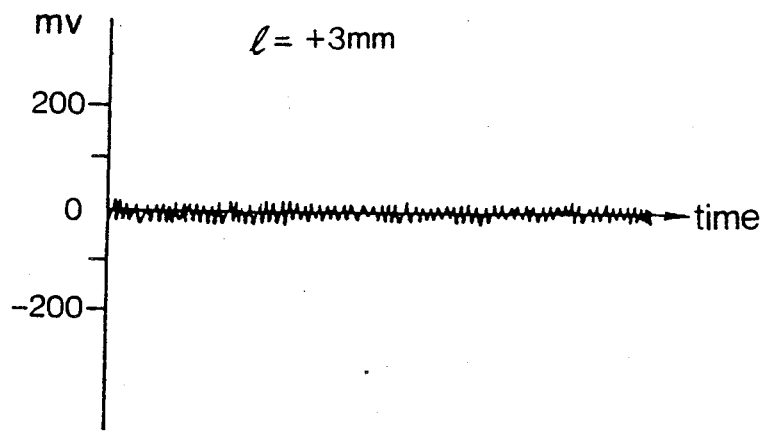

FIG. 9a shows a noise shielding member 60 which has a short cylindrical body 60a or a long cylindrical body 60a' compared with the cylindrical body 6a of FIG. 1b. The axial length of the cylindrical body 60a is shorter than the length of the main body 1a of the electromagnetic pickup 1 by 5.0 mm (l= −5.0 mm). The length of the cylindrical body 60a' is longer than the main body 1a by 3.0 mm (l= +3.0 mm). Induced noises of the pickup having the cylindrical bodies 60a and 60a' are shown in FIGS. 9b and 9c, respectively. It will be seen from the waveform of FIG. 9c that the influence of noise is considerably eliminated.

Therefore, it is preferable to provide the noise shielding member 6 to cover the entire outer side of of the electromagnetic coil 4 in the main body 1a. Since the noise shielding member 6 is made of magnetic material, a magnetic circuit is formed between the noise shielding member 6 and the core 3 of the electromagnetic pickup 1. Hence, it is necessary that the magnetic circuit is opened at the terminal end of the noise shielding member 6 corresponding to the pulse generator disk 8 so as to ensure the sensitivity of the pickup.

Further, if the terminal end of the noise shielding member 6 is projected from the end of the electromagnetic pickup 1, the terminal end may come in contact with the disk 8. Therefore, it is preferable to make the terminal end of the noise shielding member 6 flush with the end of the electromagnetic pickup 1.

Figure 10A:
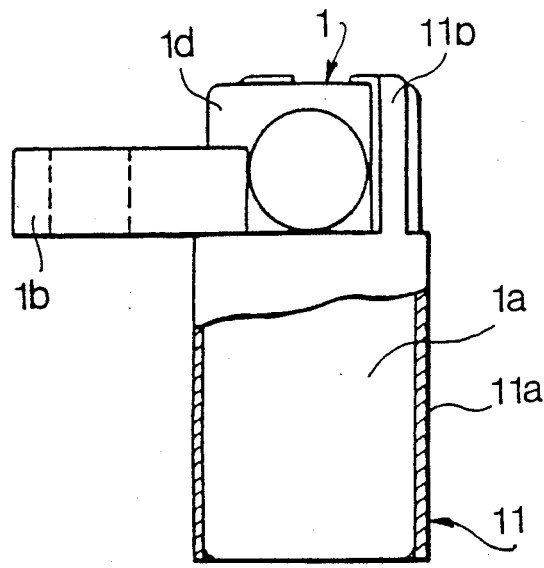
FIGS. 10a and 10b are front views, partly shown in section, showing a second embodiment of the present invention.
Figure 10B:
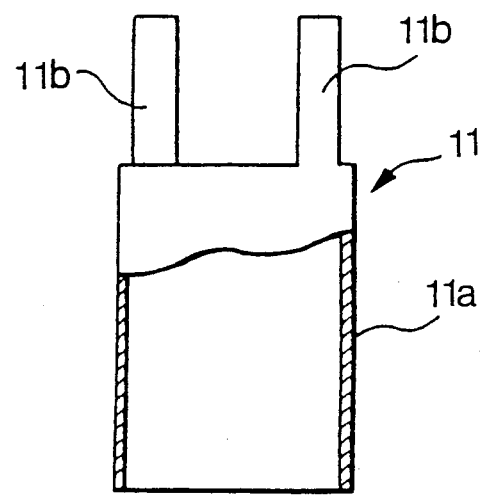

FIGS. 10a and 10b show the second embodiment of the present invention. A noise shielding member 11 has a cylindrical body 11a and a pair of arm portions 11b extended from the upper periphery of the cylindrical body 11a. When the noise shielding member 11 is mounted on the main body 1a of the electromagnetic pickup 1, an end portion of each arm portion 11b is bent inwardly to the upper surface of the upper body 1d of the electromagnetic pickup, thereby preventing the noise shielding member 11 from disengaging.

Since the noise shielding member 11 is easily mounted on the electromagnetic pickup 1, assembling thereof is simplified. Further, the noise shielding member 11 is simple in structure, thereby reducing manufacturing cost.

Figure 11A:
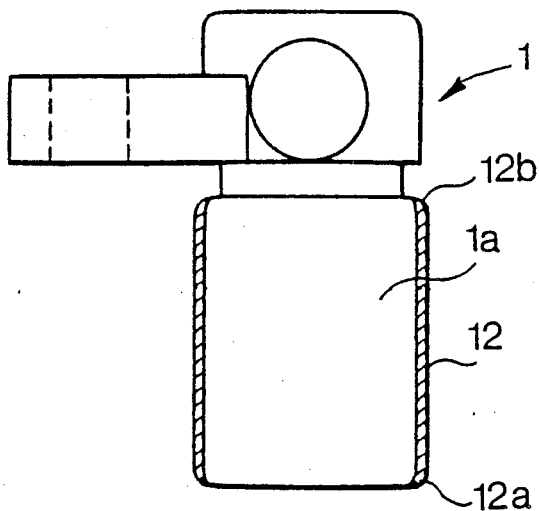
FIGS. 11a and 11b are front sectional views showing a modification of the second embodiment.
Figure 11B:
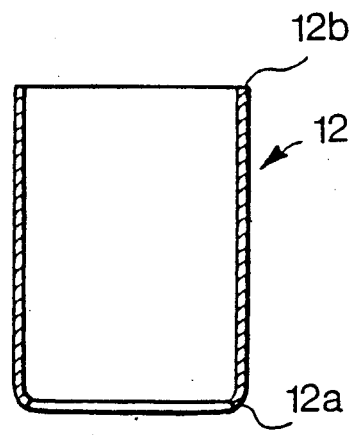

FIGS. 11a and 11b show a modification of the second embodiment. In order to prevent disengagement of a noise shielding member 12, a part or the entire bottom periphery 12a of the noise shielding member 12 is slightly bent by previously bending working. After the noise shielding member 12 is mounted on the main body 1a of the electromagnetic pickup 1, the upper periphery 12b is inwardly bent.

Figure 12:
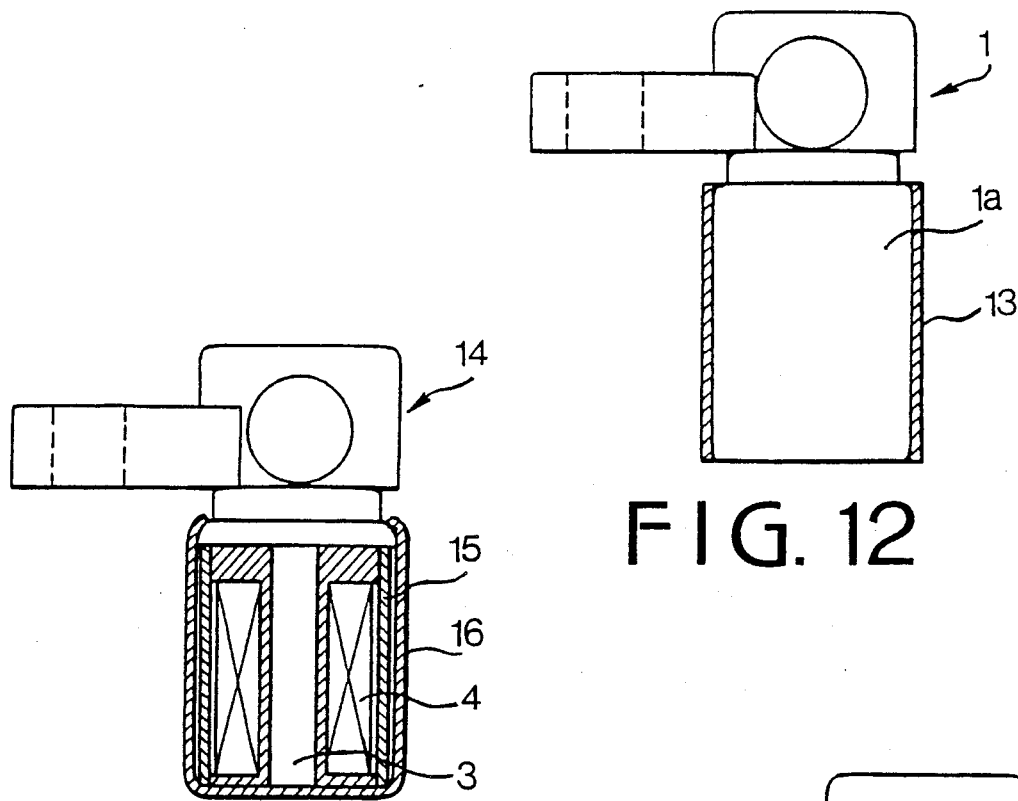
FIG. 12 is a front sectional view showing a further modification of the second embodiment.

Referring to FIG. 12 showing a further modification, a noise shielding member 13 is made by cutting a tube having a preferable bore and thickness to a predetermined length. The noise shielding member 13 is mounted on the electromagnetic pickup 1 with force fit.

In these modifications, the shape of each noise shielding member is further simplified, thereby reducing manufacturing cost.

Figure 13:
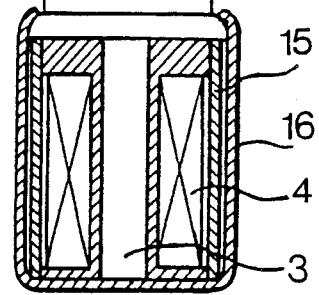
FIG. 13 is a front view, partly shown in section, showing a third embodiment of the present invention.

FIG. 13 shows the third embodiment of the present invention. An electromagnetic pickup 14 has a cylindrical noise shielding member 15 made of magnetic material which is disposed between a casing 16 made of non-magnetic material and the electromagnetic coil 4. The noise shielding member 15 is held by bending inwardly an upper end portion of the casing 16. Thus, the electromagnetic pickup 14 can be easily assembled. Further, since the noise shielding member 15 is covered by the casing 16, plating for preventing corrosion can be omitted, thereby reducing manufacturing cost. The third embodiment has the same effect as the previous embodiments.

Figure 14:
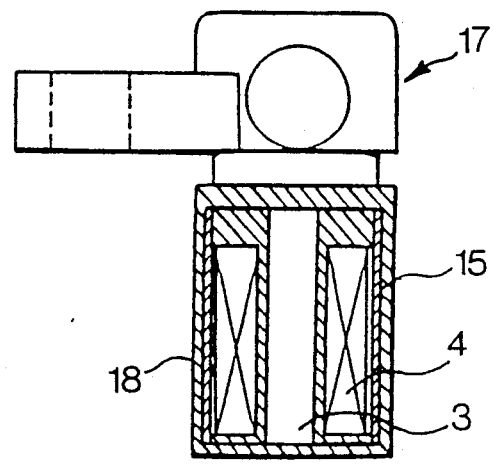
FIGS. 14 and 15 are front sectional views showing modifications of the third embodiment.

FIG. 14 shows a modification of the third embodiment. An electromagnetic pickup 17 has the noise shielding member 15 mounted on the electromagnetic coil 4. A casing 18 of plastic is provided on the noise shielding member 15 by molding.

Figure 15:
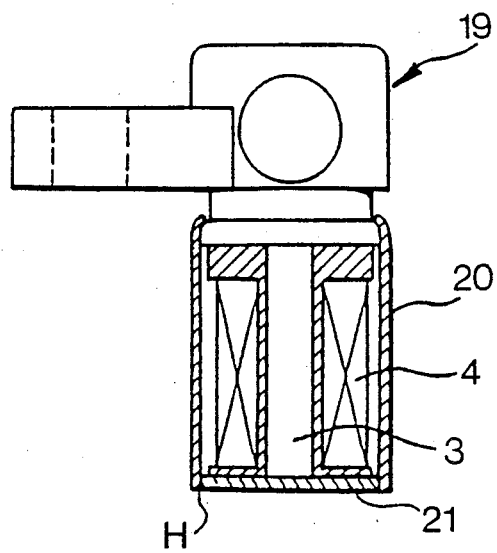

FIG. 15 shows a further modification of the third embodiment. An electromagnetic pickup 19 has a cylindrical noise shielding member 20 made of magnetic material and a disc plate 21 of non-magnetic material at the sensing end thereof. The noise shielding member 20 is secured to the electromagnetic pickup 19 and the disc plate 21 is joined to the noise shielding member 20 by brazing at a part or the entire inner periphery H.

Figure 16:
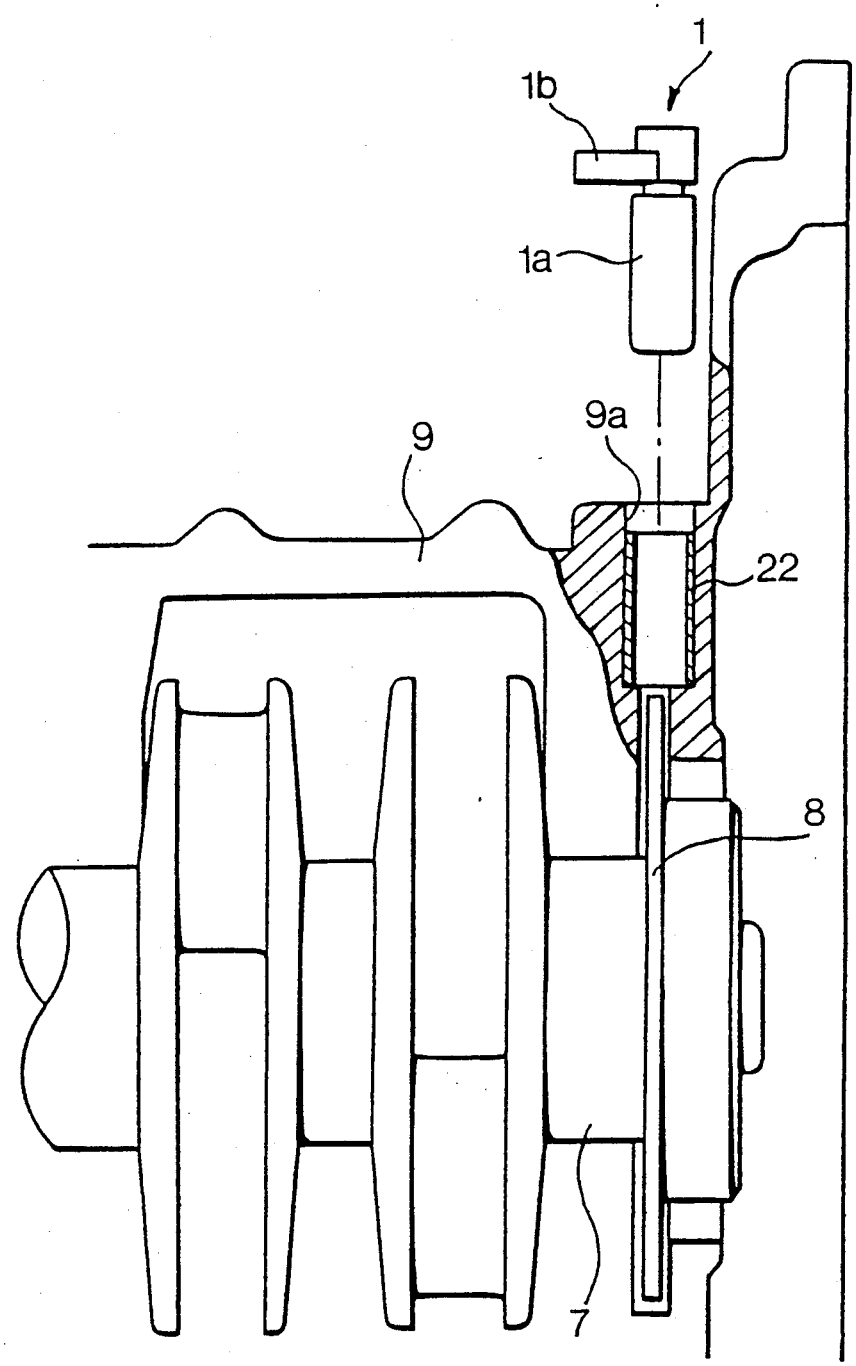
FIG. 16 shows a side view of a fourth embodiment.

Referring to FIG. 16 showing the fourth embodiment of the present invention, a cylindrical noise shielding member 22 is secured to a hole 9a of the crankcase 9 with force fit. The main body 1a of the electromagnetic pickup 1 is mounted in the noise shielding member 22, and the electromagnetic pickup 1 is secured to the crankcase 9 at the flange 1b by a bolt as described for the first embodiment.

Since the noise shielding member 22 is previously secured to the crankcase 9, the attaching work of the pickup is simplified. The maintenance of the electromagnetic pickup 1 can be performed without detaching the noise shielding member 22, so that no mistake arises in assembling.

Figure 17:
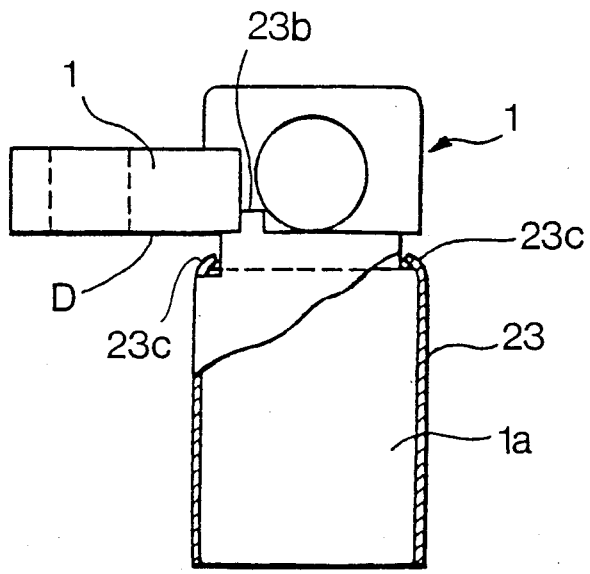
Figure 18:
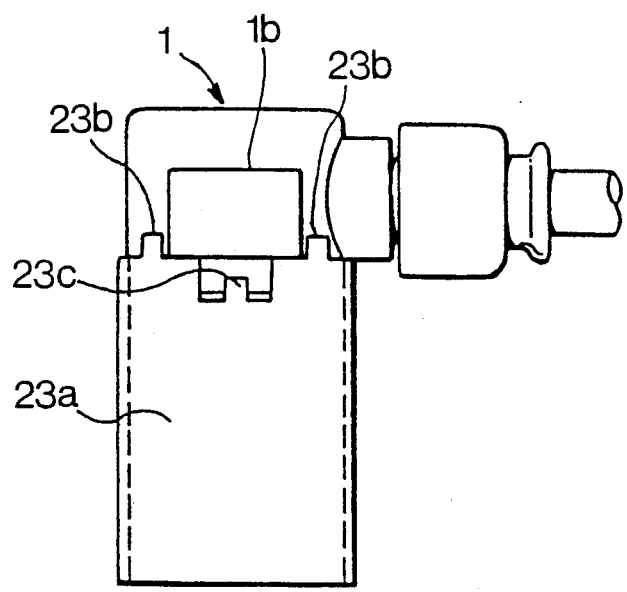
FIG. 18 is a side view of the fifth embodiment.
Figure 19A:
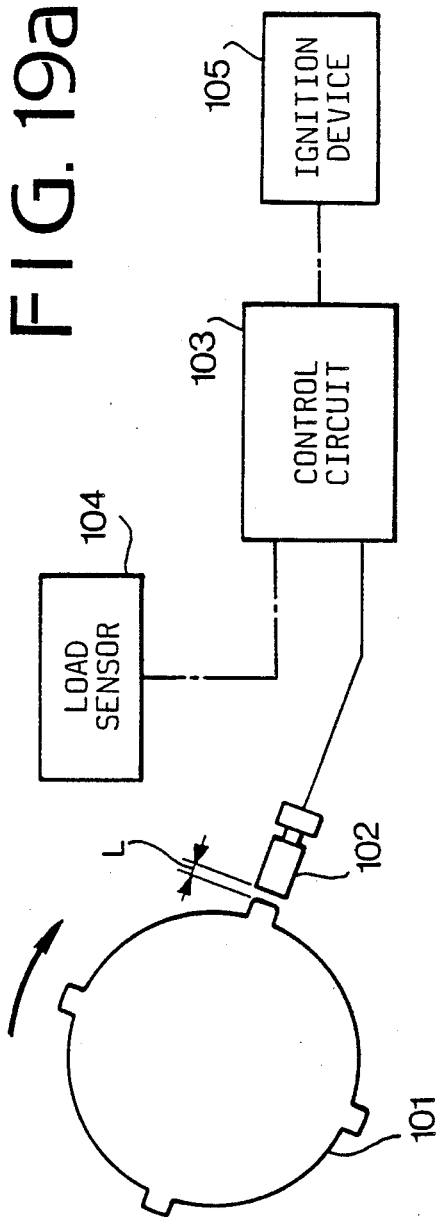
FIG. 19a is a schematic diagram showing a conventional electromagnetic pickup employed in an ignition timing control system.
Figure 19B:
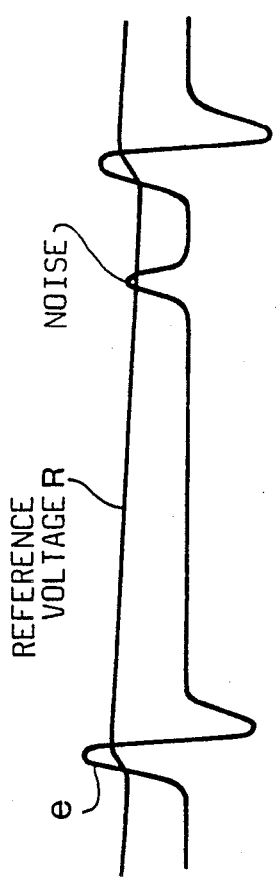
FIGS. 19b and 19c show waveforms of the output signal of the conventional electromagnetic pickup.
Figure 19C:
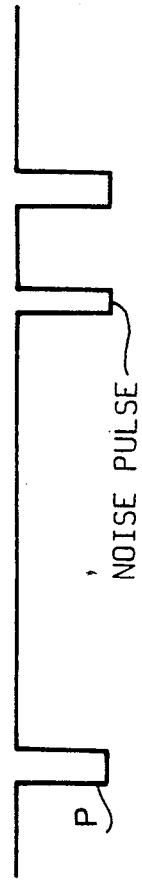

FIGS. 17 and 18 show the fifth embodiment of the present invention. A noise shielding member 23 comprises a cylindrical body 23a, a pair of positioning projections 23b, and a pair of engaging projections 23c provided at a position under an attaching surface D of the flange 1b and at a position diametrically opposite to the flange. When the noise shielding member 23 is mounted on the main body 1a of the electromagnetic pickup 1, the positioning projections 23b are positioned at both sides of the flange 1b as shown in FIG. 18. Thus, the noise shielding member 23 is positioned by the projections 23b. The engaging projections 23c are bent inwardly and the positioning projections 23b are fixed to the body of the pickup 1 with adhesive, so that the noise shielding member 23 is secured to the electromagnetic pickup 1.

Since the noise shielding member 23 is positioned by the positioning projections, it is possible to assemble the electromagnetic pickup 1 by an automatic machine, thereby reducing manufacturing cost.

In accordance with the present invention, noise is prevented from affecting the induction of the electromagnetic pickup without reducing the sensitivity of the electromagnetic pickup. Thus, the electromagnetic pickup detects the position of the notch on the disk with accuracy so that an accurate control is performed.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In an electromagnetic pickup for an engine, the pickup having a coil, a core of ferromagnetic material disposed inside of the coil and a shielding member of magnetic material located around the coil and formed with openings at both ends thereof so as to form an open magnetic circuit with the core, the improvement in the pickup comprising:

a body member of plastic comprising a main body forming a bobbin on which the coil is wound, an upper body integrated with the main body, and a flange integrally extending from the upper body, the flange being formed as an attachment member having means for securing the flange to a body of the engine; and positioning means integrated with the shielding member and engaged with the body member for positioning the shielding member to the body member so as to prevent the shielding member from disengaging from the body member.

2. The electromagnetic pickup according to claim 1, wherein
said shielding member comprises a cylindrical body located around the coil and a half-round cover integrated with the cylindrical body and mounted on the upper body of the body member;
said positioning means extends from the half-round cover and is mounted on the flange of the body member; and
means cooperating with said securing means for securing the flange of the body member to the body of the engine together with the positioning means so as to position the shielding member to the body member and to prevent the shielding member from disengaging from the body member.

3. The electromagnetic pickup according to claim 1, wherein
said shielding member comprises a cylindrical body located around the coil, and
said positioning means extends from an upper periphery of the cylindrical body to a top of the upper body of the body member, said positioning means being inwardly bent at an end thereof to engage with said top of the upper body of the body member so as to position the shielding member to the body member and to prevent the shielding member from disengaging from the body member.

4. The electromagnetic pickup according to claim 1, wherein
said shielding member comprises a cylindrical body located around the coil, and
said positioning means is formed at each end periphery of the cylindrical body and is inwardly bent so as to position the shielding member to the body member and to prevent the shielding member from disengaging from the body member.

5. The electromagnetic pickup according to claim 1, wherein
said shielding member comprises a cylindrical body located around the coil, and
said positioning means comprises positioning projections extending upwardly from the cylindrical body and located at both sides of the flange and at least one engaging projection extending upwardly from the cylindrical body and mounted to the body member, so as to position the shielding member to the body member and to prevent the shielding member from disengaging from the body member.

6. The electromagnetic pickup according to claim 1, further comprising
a cover of non-magnetic material mounted between the body member and the shielding member.

7. The electromagnetic pickup according to claim 1, wherein
said shielding member comprises a cylindrical body located around the coil, and
the cylindrical body of the shielding member extends from a lower end of the body member.

8. In an electromagnetic pickup for an engine, the pickup having a coil, a core of ferromagnetic material disposed inside of the coil and a shielding member of magnetic material located around the coil and formed with openings at both ends thereof so as to form an open magnetic circuit with the core, the improvement in the pickup comprising:
a body member of plastic comprising a main body forming a bobbin on which the coil is wound, an upper body integrated with the main body, and a flange integrally extending from the upper body, said flange being formed as an attachment member having means for securing said flange to a body of the engine;
positioning means cooperating with the shielding member and engaged with the body member for positioning the shielding member to the body member so as to prevent the shielding member from disengaging from the body member; and
said positioning means comprises a casing of non-magnetic material disposed around the shielding member and mounting the shielding member on the body member around the coil, and said casing is secured to the body member with an upper end periphery of said casing being inwardly bent onto the body member, whereby the pickup is easily assembled.

9. The electromagnetic pickup according to claim 1, further comprising
a casing of non-magnetic material disposed around the shielding member and secured to the body member and the shielding member by molding.

10. An angle detecting system of an engine, the system having an electromagnetic pickup, a disk with a plurality of projections disposed opposite to the pickup, and a control circuit responsive to an output signal from the pickup for detecting a rotating angle of the disk, said pickup having coil, and a shielding member of magnetic material located around the coil and provided with openings at both ends thereof so as to form an open magnetic circuit with the core, the pickup comprising:
a body member of plastic comprising a main body forming a bobbin on which the coil is wound, an upper body integrated with the main body, and a flange integrally extending from the upper body, said flange being formed as an attachment member having means for securing said flange to a body of the engine; and
positioning means integrated with the shielding member and engaged with the body member for positioning the shielding member to the body member so as to prevent the shielding member from disengaging from the body member;
said body of the engine forming a hole to slidably support the shielding member, the latter containing the main body of the body member therein; and the system further comprising
means cooperating with said securing means for securing the flange of the body member to the body of the engine so as to keep clearance between the pickup and the disk constant with respect to the engine.

11. The angle detecting system according to claim 10, wherein
said shielding member is force fit in said hole.

* * * * *